(12) United States Patent
Randløv

(10) Patent No.: US 11,412,843 B2
(45) Date of Patent: Aug. 16, 2022

(54) SLIDER ELEMENT FOR LIFTING COLUMNS

(71) Applicant: LINAK A/S, Nordborg (DK)

(72) Inventor: Michael Lindekilde Randløv, Vijens (DK)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 17/050,986

(22) PCT Filed: May 2, 2019

(86) PCT No.: PCT/DK2019/000153
§ 371 (c)(1),
(2) Date: Oct. 27, 2020

(87) PCT Pub. No.: WO2019/210917
PCT Pub. Date: Nov. 7, 2019

(65) Prior Publication Data
US 2021/0227970 A1 Jul. 29, 2021

(30) Foreign Application Priority Data

May 2, 2018 (DK) .......................... PA 2018 00193

(51) Int. Cl.
*A47B 9/20* (2006.01)
*F16C 29/02* (2006.01)

(52) U.S. Cl.
CPC ................ *A47B 9/20* (2013.01); *F16C 29/02* (2013.01); *A47B 2200/0054* (2013.01); *A47B 2200/0061* (2013.01)

(58) Field of Classification Search
CPC .............. A47B 9/20; A47B 2200/0052; A47B 2200/0051; F16C 29/02
(Continued)

(56) References Cited

U.S. PATENT DOCUMENTS

| 4,667,605 A | * | 5/1987 | Bastian | .................... A47B 9/20 108/106 |
| 5,022,768 A | | 6/1991 | Baxter | |

(Continued)

FOREIGN PATENT DOCUMENTS

| EP | 1 250 866 A1 | 10/2002 |
| EP | 1 479 963 A2 | 11/2004 |

(Continued)

*Primary Examiner* — Jose V Chen
(74) *Attorney, Agent, or Firm* — Dykema Gossett PLLC

(57) ABSTRACT

Slider element for lifting columns, preferably for height-adjustable tables, said lifting columns comprise at least two profiles 10,11 arranged telescopically relative to each other, where the slider element 1 has a first slider 2 and a second slider 3 between which there is a designated breaking line 4. The slider element is mounted with the second slider 3 on the outer side of the inner profile 10, and is subsequently guided into the hollow of the outer profile 11, by which the first slider 2 affixes itself to the inner side of the outer profile and when the two profiles are retracted further, the designated breaking line 4 between the first and the second slider 2,3 will break, by which they appear as two separate sliders mounted on a profile each. Thus, a simplified mounting of the sliders is achieved. In addition, it can be constructed such that the sliders are completely concealed within the lifting column.

15 Claims, 9 Drawing Sheets

(58) Field of Classification Search
USPC .............................. 108/147; 248/161, 188.5
See application file for complete search history.

(56) References Cited

U.S. PATENT DOCUMENTS

| | | | | |
|---|---|---|---|---|
| 6,299,113 | B1* | 10/2001 | Yamashita | A47B 9/20 248/161 |
| 9,629,452 | B1* | 4/2017 | Chen | F16C 29/02 |
| 9,743,755 | B2* | 8/2017 | Lin | A47C 3/30 |
| 10,107,448 | B1* | 10/2018 | Hung | A47C 7/00 |
| 10,226,119 | B1* | 3/2019 | Ko | A47B 9/20 |
| 10,631,631 | B1* | 4/2020 | Pei | B66F 3/28 |
| 10,695,251 | B2* | 6/2020 | Revenus | A61G 13/06 |
| 2013/0221171 | A1* | 8/2013 | Lorenzen | A47B 9/20 248/188.5 |
| 2016/0102693 | A1* | 4/2016 | Wang | F16M 11/28 248/161 |
| 2016/0281912 | A1* | 9/2016 | Christen | A47C 3/40 |
| 2018/0303233 | A1* | 10/2018 | DeGroot | A47B 9/20 |
| 2019/0174913 | A1* | 6/2019 | Lin | A47B 9/10 |
| 2019/0357668 | A1* | 11/2019 | Knudtson | A47B 9/20 |
| 2020/0037753 | A1* | 2/2020 | Ko | A47B 9/10 |
| 2020/0128949 | A1* | 4/2020 | Huang | A47B 9/20 |
| 2020/0132116 | A1* | 4/2020 | Walling | F16C 29/02 |
| 2021/0227970 | A1* | 7/2021 | Randlov | B66C 23/707 |

FOREIGN PATENT DOCUMENTS

| | | |
|---|---|---|
| WO | 02/063996 A1 | 8/2002 |
| WO | 2012013190 A2 | 2/2012 |
| WO | 2017148467 A2 | 9/2017 |

* cited by examiner

SLIDER ELEMENT FOR LIFTING COLUMNS

CROSS-REFERENCE TO RELATED APPLICATIONS

This application is a national stage filing based upon international application no. PCT/DK2019/000153, filed 2 May 2019 (the '153 application), and published in English on 7 Nov. 2019 under international publication no. WO 2019/210917 A1, which claims priority to Denmark (DK) patent application no. PA 2018 00193, filed 2 May 2018 (the '193 application). The '153 application and the '193 application are both hereby incorporated by reference as though fully set forth herein.

The present invention relates to a slider element for lifting columns, preferably for height-adjustable tables, said lifting columns comprise at least two profiles arranged telescopically relative to each other and at least one slider located between the two profiles as the slider is secured to one of these. Further, the invention relates to a method for mounting the slider element. The invention moreover relates to a lifting column equipped with such a slider element and a table equipped with such a lifting column.

Lifting columns for height-adjustable tables are usually made from steel tubes or extruded aluminum tubes. Between the individual profiles of the lifting columns, sliders in the form of separate tiles, typically made from a synthetic material, are arranged, just as there are also examples of sliders in the form of bushings and axially running strips. Examples of sliders are known from EP 1 479 963 A2 to Heinrich J Kesseböhmer K G and WO 02/063996 A1 to Rol Ergonomic AB. The mounting of the sliders is done individually and requires quite a lot of work. WO 2017/148467 A2 to Oelschläger Metalltechnik GmbH discloses a method for die casting of the sliders directly between the two profiles.

The purpose of the invention is to provide sliders with which a simplified mounting can be achieved.

This is achieved according to the invention with a slider element having a first slider and a second slider between which there is a designated breaking line.

The slider element can be constructed such that the first and second slider are placed differently relative to each other e.g. next to each other, displaced or in a different manner. In an expedient embodiment, the slider element is constructed such that the first and the second slider are in continuation of each other and that the designated breaking line is located between the adjacent ends thereof. This will in most cases give an optimum manufacturing and mounting of the slider element.

The designated breaking line between the two sliders can be executed in various ways. It can thus be a perforation or a weakening of the material. In a special embodiment, the designated breaking line is constituted by a pin on the end of one of the sliders, which is positioned between two pins on the end of the other slider, and where the pins are connected by a string. This embodiment enables an easy tearing of the designated breaking line, and it is of no importance for the appearance and the function that the pins are left on the respective sliders after tearing of the strings which connect these.

In an embodiment of the slider element, each slider comprises a base element on which there is a rise with a sliding surface. It is thus possible to make the base element relatively thin and thus also the gap between the profiles. A thin base element also makes the slider element relatively flexible, which eases the mounting.

The first slider can be constructed with various types of retentive means, e.g. studs, protrusions etc. In a special embodiment, the retentive means are constructed as a resilient element, a tongue which at an angle protrudes outside of the plane of the base element. Expediently, there is a resilient element in each side. The construction with the resilient element has the advantage that it will only be necessary to make an indentation in the side wall of the profile, such that it will not be visible from the outer side. It is of course understood that it could also be through-going holes, if this is desired, just as the retentive means can also be a stud or another type of protrusion.

The second slider can likewise be provided with various types of retentive means, e.g. snap locks or gluing. In an embodiment, the second slider on the internal side of the base element has a stud. This stud can be positioned in a through-going hole in the profile. Typically, the stud as well as the hole are elongated, such that the slider element is retained against rotation.

The invention further relates to a lifting column as stated in the claims 13-14 comprising at least two profiles arranged telescopically relative to each other, as one profile, the inner profile, is intended for insertion into the other profile, the outer profile, and at least one slider element as stated in one of the claims 1-12.

In an embodiment for the lifting column, the sides of the inner profile are provided with through-going holes for the studs on the second slider of the slider element. Since only indentations for receiving the protruding resilient elements on the first slider are formed internally in the outer profiles, the outer side of the lifting column remains intact. In other words, there are no visible traces of the sliders, such as holes and studs, on the surface of the lifting column, which thus appears smooth.

In a further embodiment, at least one of the studs of the slider element has an extended length, such that it can be utilized for fixation of an end portion in a profile of the lifting column. The stud has an extended length in order for it to protrude into the hollow of the profile on which it is mounted and grip into a recess in an end piece, which is mounted in the profile for fixation thereof. The flexibility, at least in the area around the stud can be adapted such that the stud yields when the end piece is pressed into the profile and snaps into a recess intended for that purpose, which can also be a channel when this is located opposite the stud.

In a special embodiment, the slider element according to the invention is constructed as a cylindrical element for insertion over a profile, and where the element comprises a number of first and second sliders, e.g. four sets of sliders. Needless to say, this eases the mounting as only one element should be mounted.

The invention further relates to a method for mounting of slider elements according to one of the claims 1-12 in a lifting column as stated in one of the claims 13-14, where the slider element is mounted on the outer side of the inner profile by pressing the studs on the second slider into the through-going holes in this profile, and that the inner profile with mounted slider element subsequently is led into the hollow of the outer profile, by which the resilient element at the side of the first slider snaps into the indentations in the inner side of the outer profile, and when the two profiles are retracted further the designated breaking line between the first and the second slider will break, by which they appear as two separate sliders mounted on a profile each.

The invention further relates to a table equipped with one or more lifting columns according to one or more of the claims 13-14. The lifting columns can appear as table legs for adjusting the height of the table, but the table can also be equipped with one or more lifting columns for raising and lowering of computer screens or other equipment relative to the tabletop.

Expediently, the invention is used in connection with members consisting of tubular profiles e.g. having closed cross sections, as tubular profiles per se provide a good stability. The invention is, however, not limited to this. The members can also be constituted by profiles having an open cross section either made from extruded aluminum or bent steel plates.

The invention will be explained more fully below with reference to the accompanying drawing. In the drawing.

Figure 10:
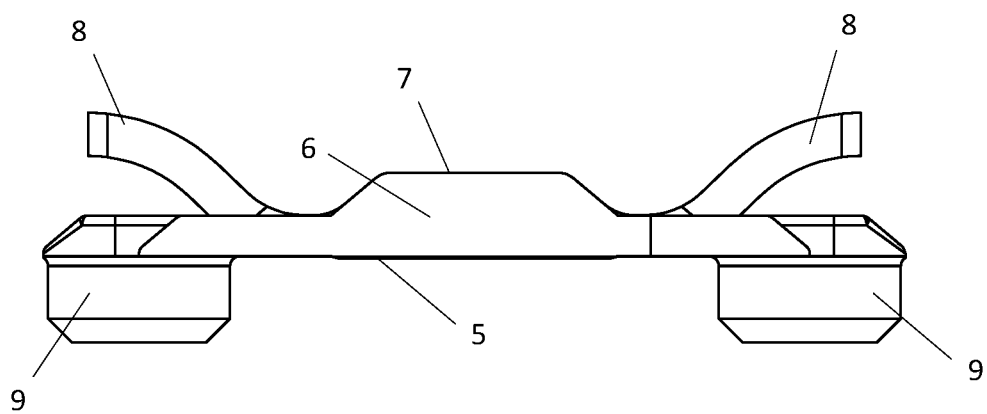
Figure 5:
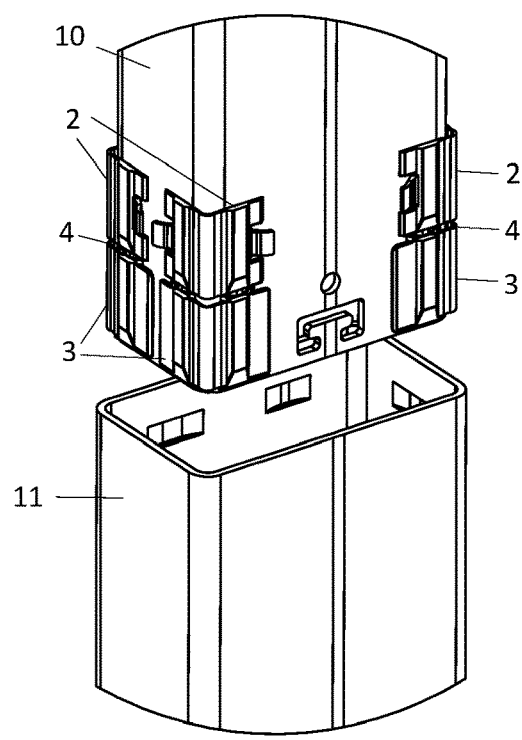
Figure 6:
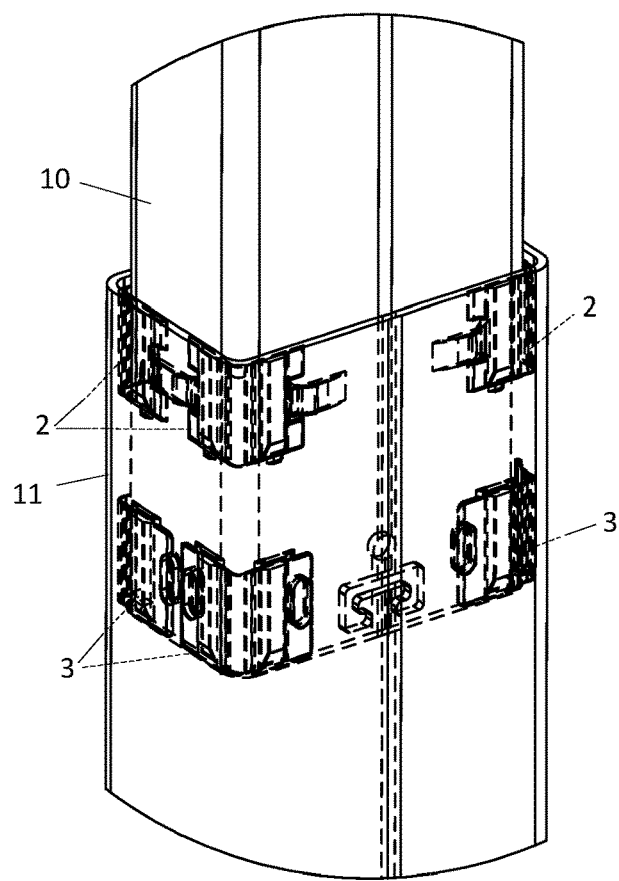
Figure 7:
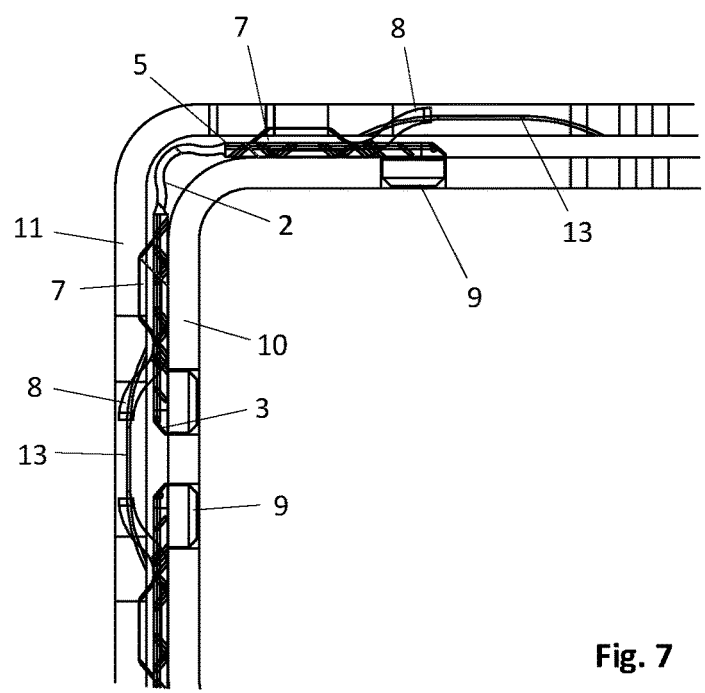
Figure 8:
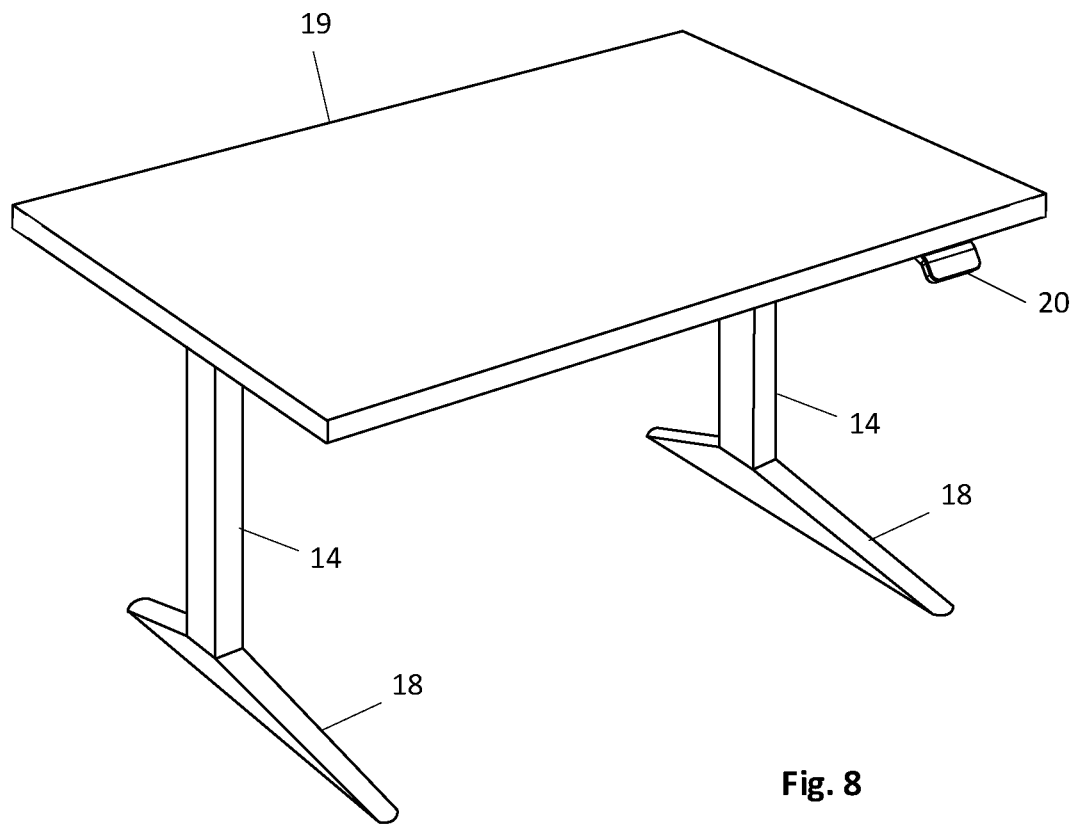
Figure 9:
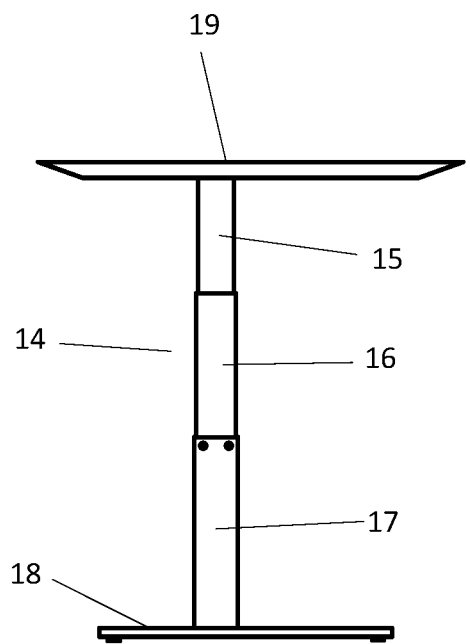
Figure 11:
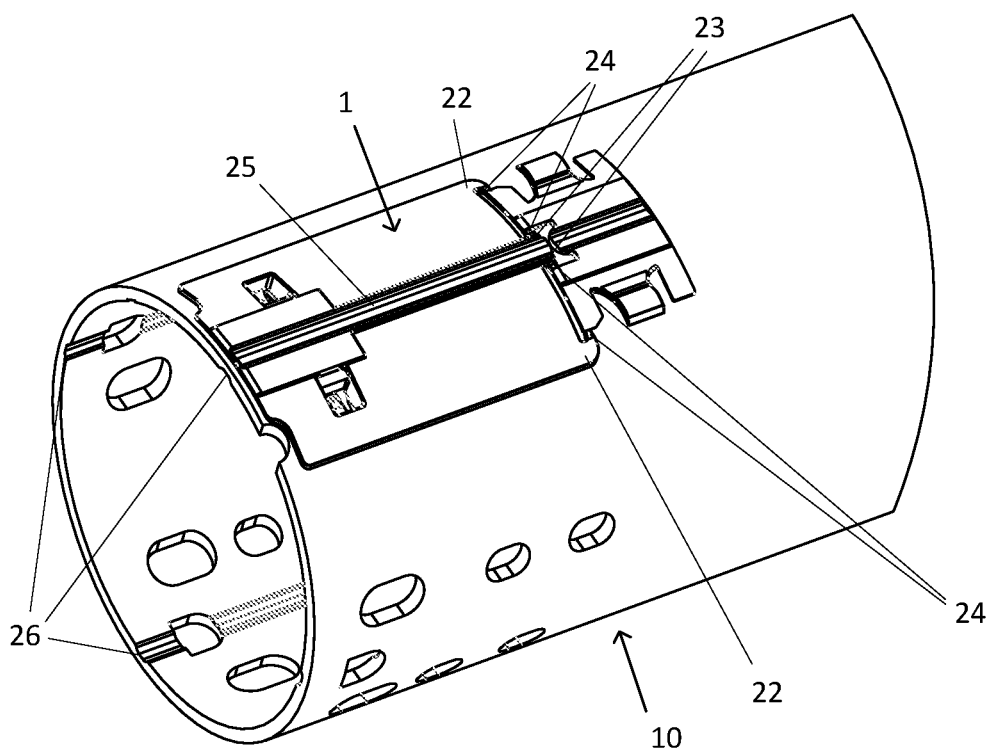
Figure 12:
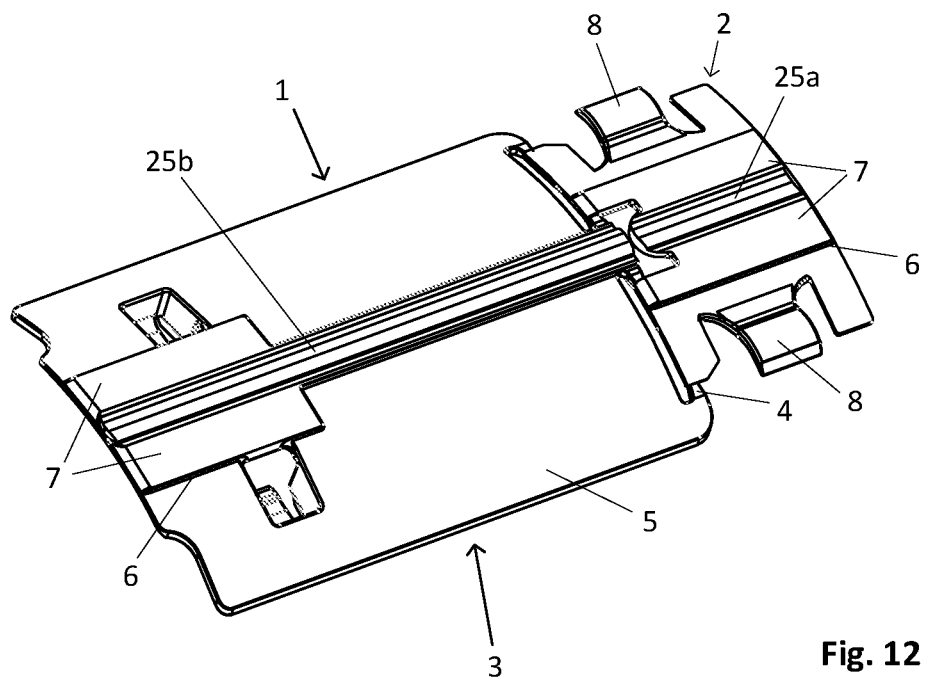
Figure 13:
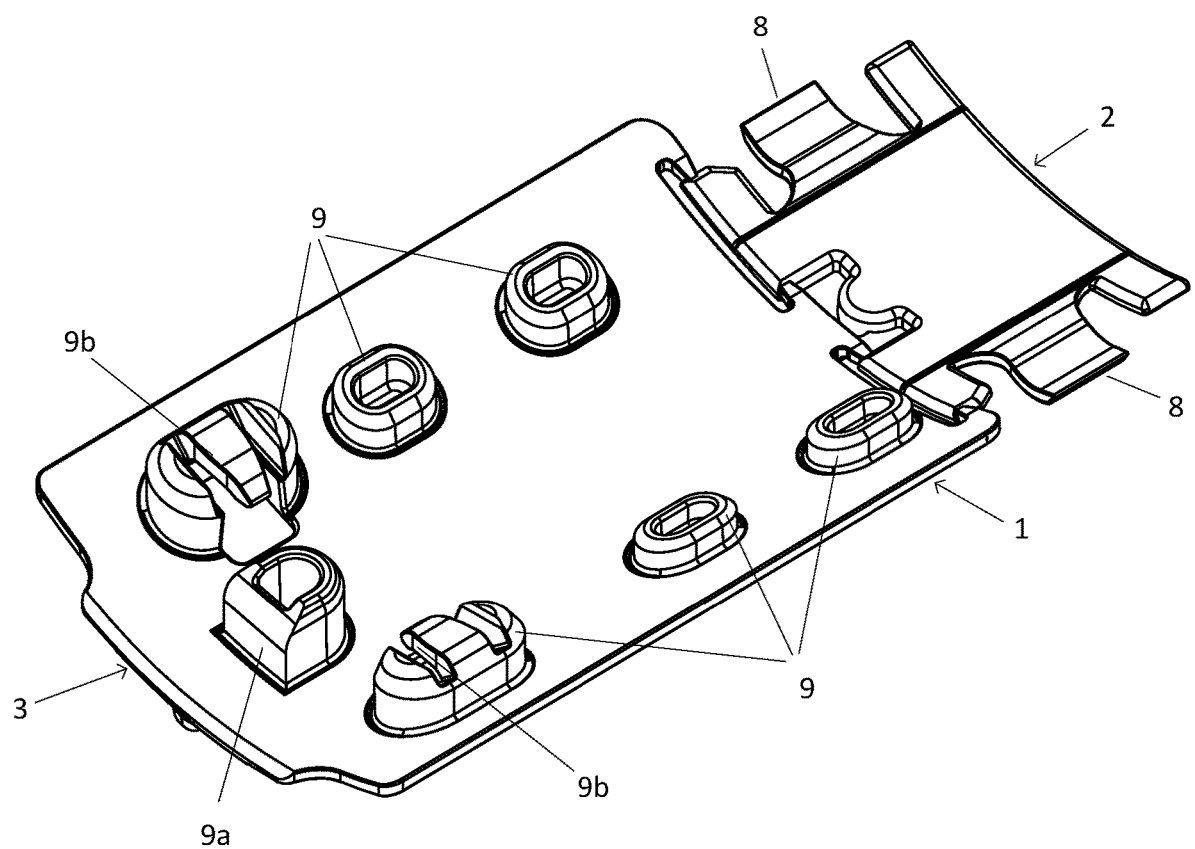
Figure 14:
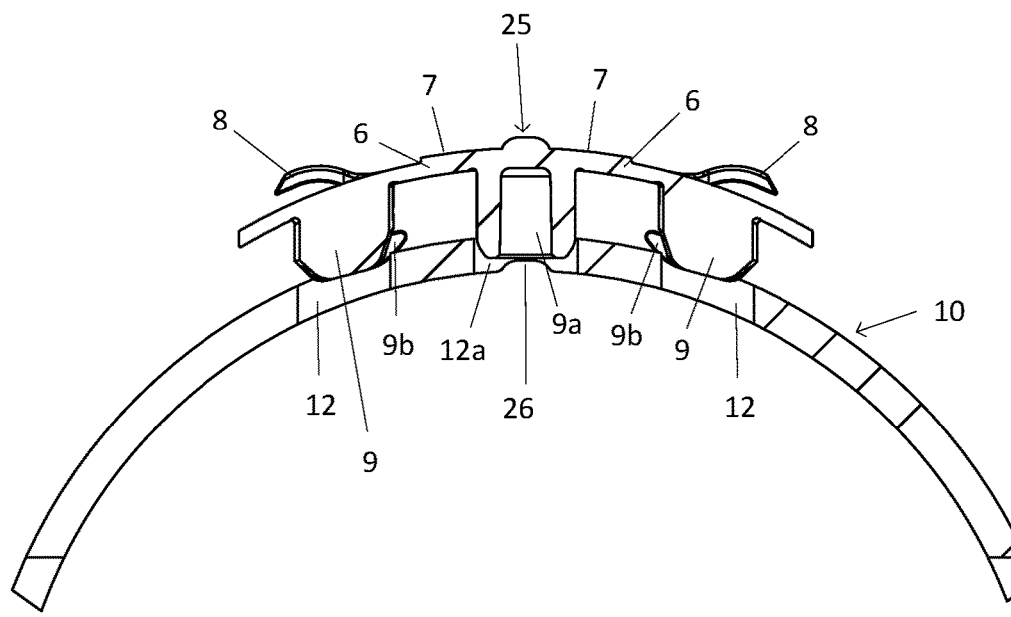
Figure 15:
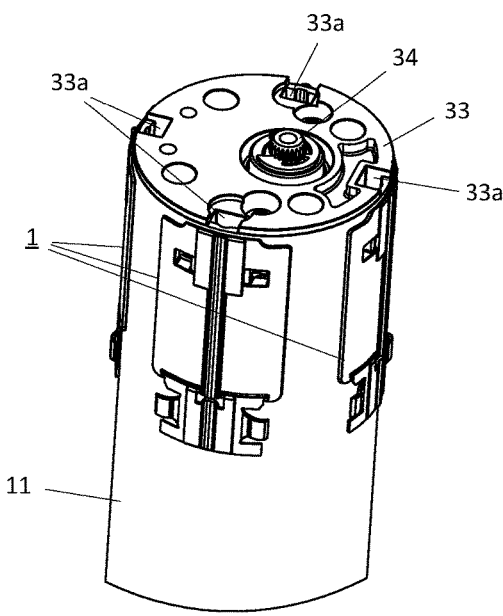
Figure 16:
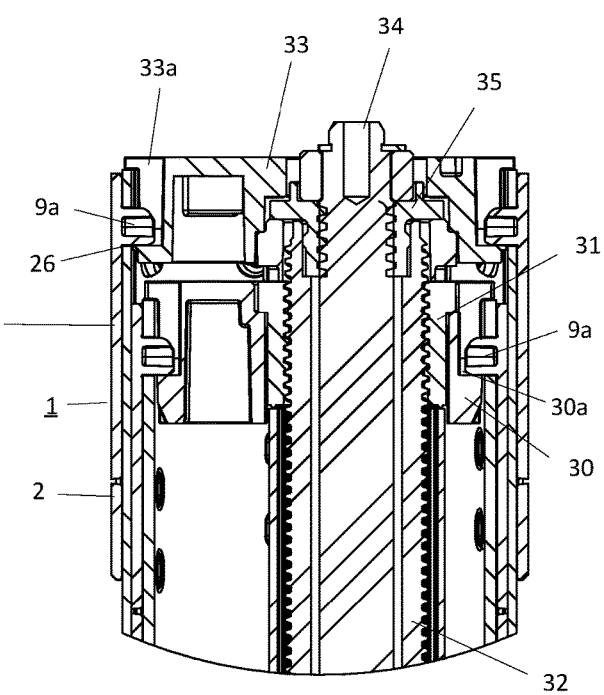
Figure 17:
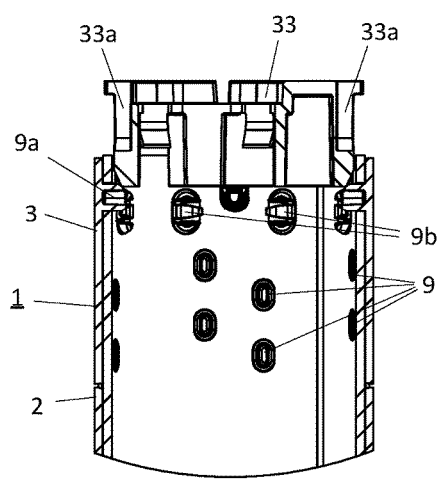
Figure 18:
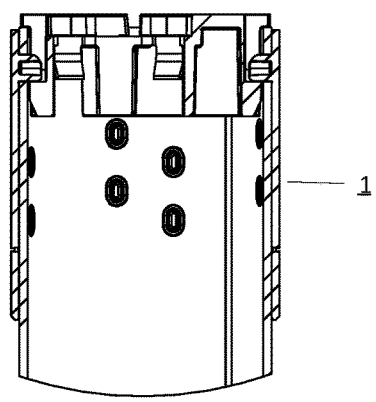
Figure 19:
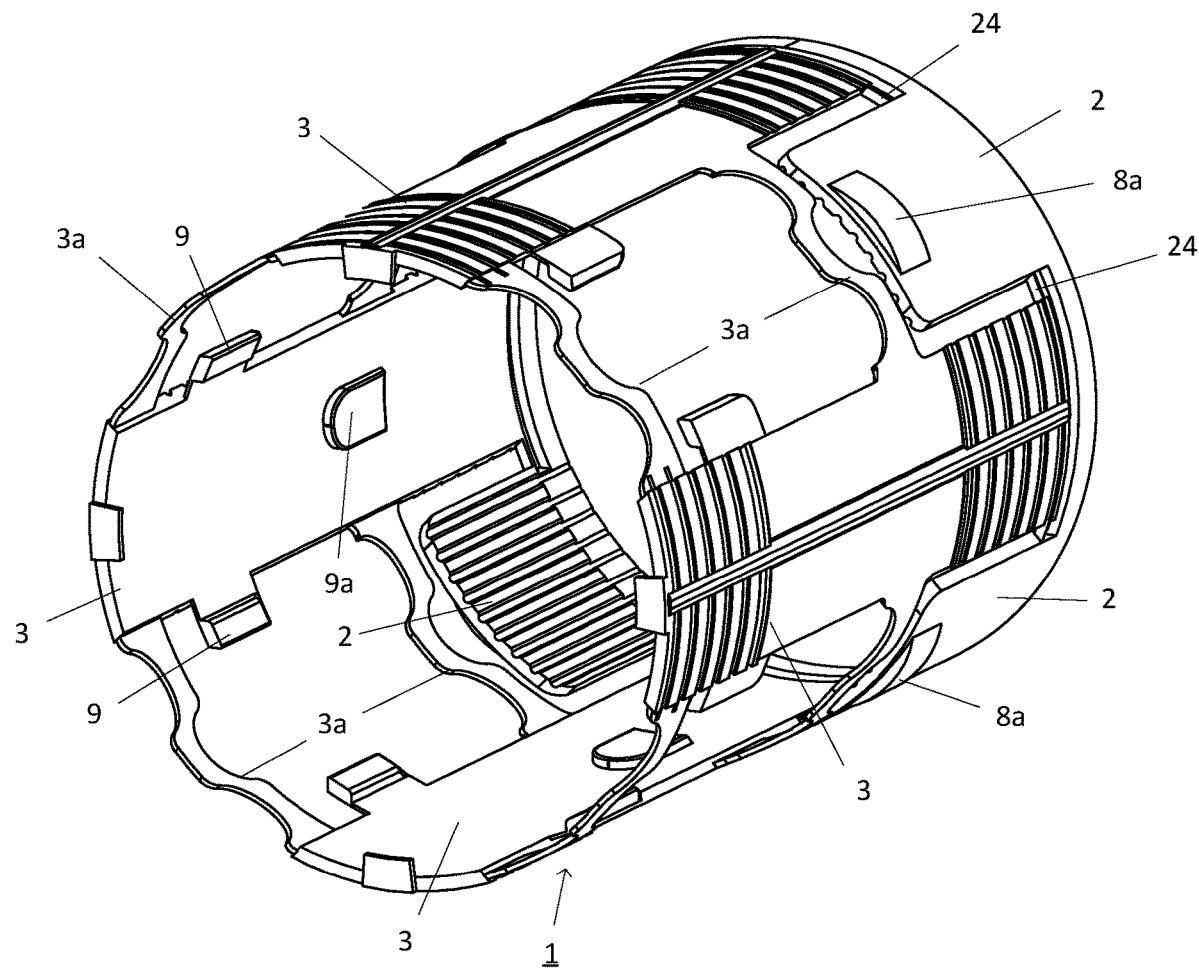

FIG. 5 shows the ends of the two telescopic profiles with mounted slider elements, FIG. 6 shows the inner and the outer telescopic profile in the retracted state with mounted sliders, and where the outer profile is shown transparent, FIG. 7 shows a cross section through a corner in the outer and the inner profile, FIG. 8 shows a perspective view of a desk, and FIG. 9 shows the desk of FIG. 8 seen from the ends in its fully extended position, FIG. 10 shows a slider element seen from above intended for mounting on a plane surface, FIG. 11 shows the end of the inner profile with circular cross section mounted with a slider element, FIG. 12 shows a slider element seen from the front, FIG. 13 shows the slider element of FIG. 12 seen from the rear, and FIG. 14 shows a cross section at the lower end of the internal profile and the slider element during mounting on the profile, FIG. 15 shows the end of a three-part lifting column, where the outermost profile has been removed such that the intermediate profile is visible, FIG. 16 shows a cross section through the end of the lifting column shown in FIG. 15, FIG. 17 shows a cross section through the intermediate profile shown in FIG. 15 with an end portion ready for mounting, FIG. 18 shows a cross section as shown in FIG. 17, where the end portion is mounted in the profile, and FIG. 19 shows a slider element constructed as a cylindrical element for insertion over a profile in the lifting column.

Figure 1:
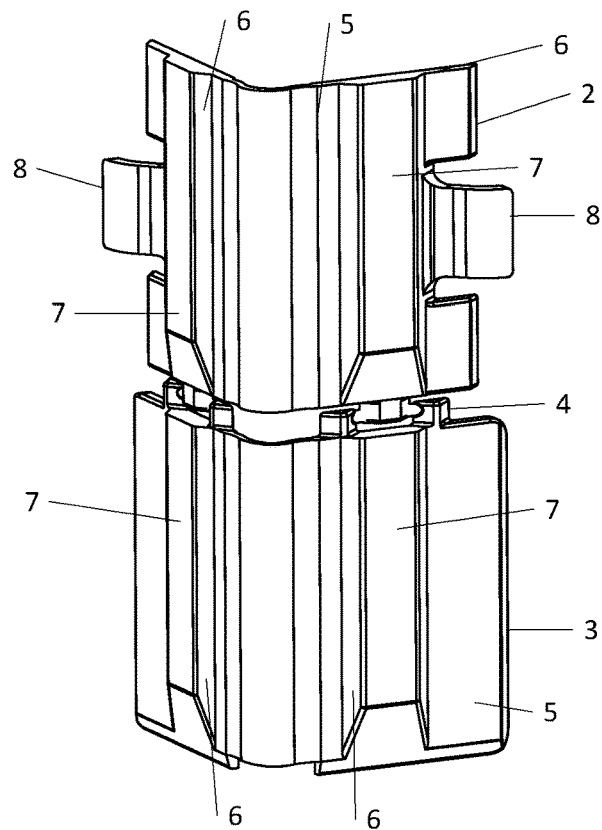
FIG. 1 shows a slider element seen from the front.
Figure 2:
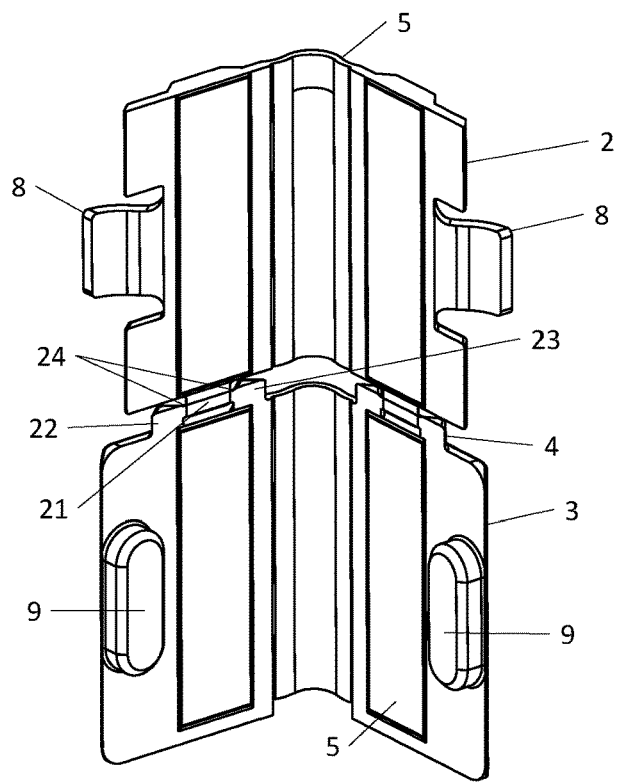
FIG. 2 shows the slider element seen from the rear.
Figure 3:
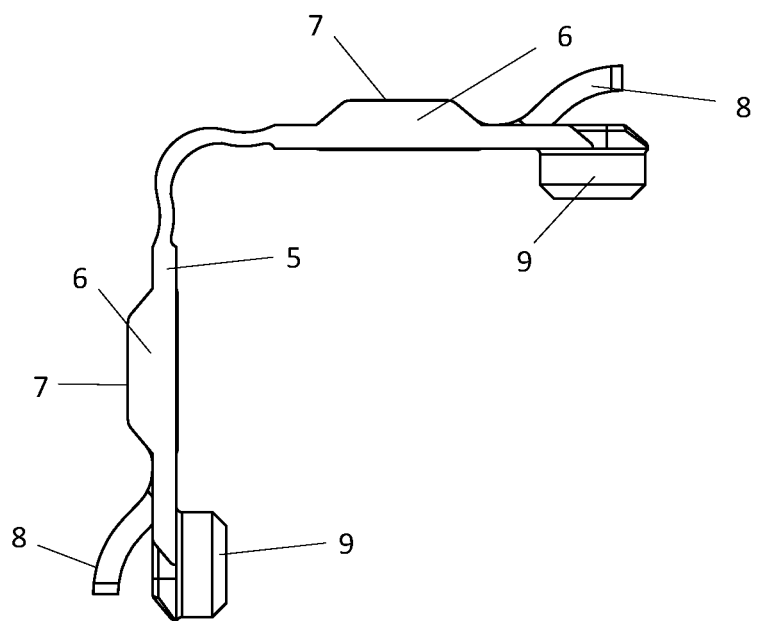
FIG. 3 shows the slider element seen from the upper end.

FIGS. 1-3 of the drawing show an embodiment of a slider element 1 according to the invention intended for lifting columns having a square or rectangular cross section, where FIG. 1 shows the slider element seen from the front and FIG. 2 shows the slider element seen from the rear, and in FIG. 3 it is shown from the upper end.

The slider element 1, which is constructed as one piece, comprises a first slider 2 and a second slider 3, between which there is a designated breaking line 4. Each slider 2,3 comprises a base element 5 on which there is a rise 6 with a sliding surface 7. At each side, the first slider 2 comprises a resilient element 8, a tongue which at an angle protrudes outwards from the outer side of the base element 5, i.e. the side facing towards the inner side of the surrounding profile when the slider element is mounted. The second slider 3 is equipped with a stud 9 on the inner side of the base element 5, i.e. the side facing towards the outer side of the profile on which it is mounted. The stud 9 is here rectangular running in the longitudinal direction of the slider, which ensures a stable positioning of the slider.

Figure 4:
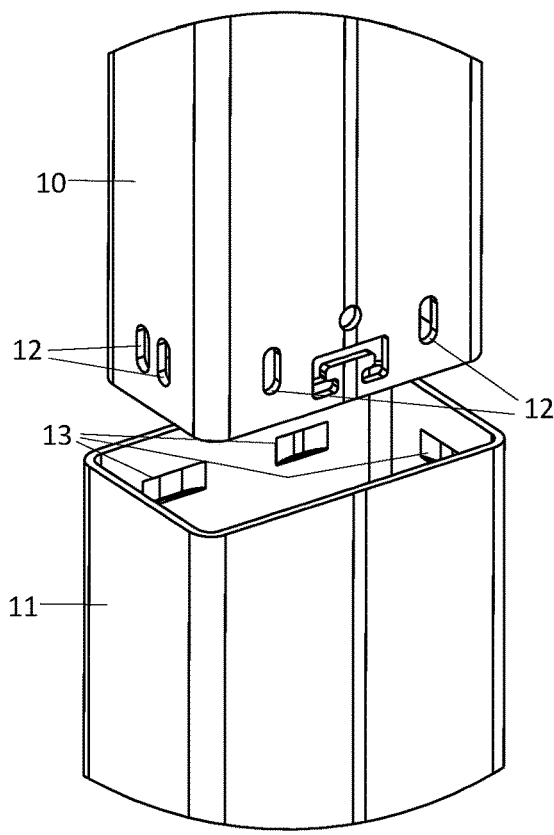
FIG. 4 shows the ends of two telescopic profiles.

In FIGS. 4 and 5 of the drawing, the ends of two telescopic profiles are shown, where one profile, the inner profile 10 is intended for insertion in the other profile, the outer profile 11. The two profiles have, as it appears from the drawing, a rectangular cross section. In the sides of the inner profile 10, recesses 12 for the studs 9 on the second slider 3 of the slider element are constructed. The recesses are here constructed as through-going holes such that the studs can have a maximum height and thus ensure a secure fixation. Internally in the outer profile 11 there are indentations 13 for receiving the protruding resilient elements 8 on the first slider 2.

The slider element 1 is mounted on the outer side of the inner profile 10 by pressing the studs 9 on the second slider 3 into recesses 12 in this profile. The inner profile with mounted slider element is subsequently led into the hollow of the outer profile 11, by which the resilient elements 8 in the side of the first slider 2 snap into indentations 13 in the inner side of the outer profile 11. When the two profiles 10,11 are retracted further, the designated breaking line 4 between the first and the second slider 2,3 will break. The second slider 3 will thus still be mounted externally on the end of the inner profile 10, while the first slider 2 will be mounted internally at the end of the outer profile, hence see FIG. 6, where the outer profile 11 is shown transparent. FIG. 7 shows a cross section through a corner of the outer and inner profile 11,10, from which it appears how the resilient elements 8 on the first slider 2 protrudes into the indentations 13 on the inner side of the outer profile 11.

The designated breaking line 4 is here constituted by pins connected by a string. On the ends of the two sliders 2,3 located opposite each other, the end of the first slider 2 is equipped with a pin 21 which protruded between two pins 22,23 on the end of the second slider 3. The pins 21 are connected to the two other pins 22,23 by a string 24 running between the adjacent sides on the pins. When the sliders 2,3 during assembly of the profiles are exposed to opposing axial forces, the strings 24 between the pins 22,23 are torn and the two sliders 2,3 will thus separate and subsequently appear as two individual sliders, as stated above. The designated breaking line should be constructed such that the force required to break this does not expose the resilient elements 8 of the first slider 2 or the studs on the second slider 3 to an unnecessary overload such that these are pulled out of engagement or in any other way are damaged. As it appears, the sliders 2,3 are not visible on the assembled telescopic profiles 10,11 which gives these a clean and smooth appearance without distracting holes and elements from the sliders.

The desk shown in FIGS. 8 and 9 contains a lifting column at each end. The lifting columns comprises three telescopic profiles 15,16,17 and are fixedly mounted with the lower end of the outer profile 17 in a foot 18. The tabletop 19 is mounted to the upper end of the lifting columns. The movement of the columns 14 is brought about by a built-in linear actuator, containing a spindle-/spindle nut unit, which through a gear is driven by an electric motor connected to a control box with a power supply. Likewise, the control box contains a controller which is activated by means of a control panel 20 placed at the front edge of the desk.

When the three profiles 15,16,17 of the lifting columns 14 are assembled, the outer profile 17 and the intermediate profile 16 appear as the inner and outer profile 10,11 as described in connection with FIGS. 1-7. When the inner profile 15 and the intermediate profile 16 are assembled, these appear as the inner and outer profile 10,11 as described in connection with FIGS. 1-7.

The embodiment is here shown in connection with a lifting column having a rectangular cross section where the slider element has an angular shape for mounting around the corners of the profile. However, the invention can naturally also be used in connection with lifting columns having a different cross section, such as e.g. a square, hexagonal, round or oval cross section. In FIG. 10, a slider element intended for mounting on a flat surface is shown from above, but it is understood that the slider element is designed with a curvature such that it may be mounted on a lifting column having a round or oval cross section.

FIGS. 11-14 of the drawing show an example of a slider element specifically intended for lifting columns having a circular cross section. For components having a similar function as stated in the previous, the same references numerals have been used. The slider element 1 is constructed in one piece, comprising a first slider 2 and a second slider 3, between which a designated breaking line has been constructed. Each slider 2,3 contains a base element 5, where a rise 6 with a sliding surface 7 has been constructed. For mounting, the first slider 2 contains a resilient element 8, a tongue which at an angle protrudes over the top side 5 of the base element. On the inner side of the base element 5 along the sides, the second slider 3 is equipped with studs 9 for mounting of this. The two studs at the lower edge of the base element 5 are equipped with a tongue 9b which in the mounted position of the sliders 3 grips around the rear side of the profile 10. The remaining studs are firm. In addition, the tongues 9b ensure that the slider 3 with the lower end fits closely to the outer side of the profile 10, which is essential during assembly with the outer profile 11. This ensures that the slider does not tilt outwards with its lower edge, thus complicating the assembly of the profiles. The studs 9 are placed in two rows along the sides of the slider 3, and the firm studs in the two rows are here displaced relative to each other which ensures a good positioning of the sliding element.

The slider element 1 is mounted on the outer side of the inner profile 10 by pressing the studs 9 on the second slider 3 into the holes 12 in the profile intended for that purpose. The inner profile with the mounted slider element is, as previously explained, subsequently guided into the hollow of the outer profile by which the resilient elements 8 at the side of the first slider 2 snap into the indentations of the inside of the outer profile. When the two profiles are retracted further, the designated breaking line 4 between the first and the second slider 2,3 will break. The second slider 3 will thus continued be mounted on the outer side of the end of the inner profile 10 while the first slider 2 will be mounted on the inner side of the end of the outer profile.

As in the previous embodiments, the designated breaking line 4 is here constructed as a pin connected with strings. On the ends of the two sliders 2,3 located opposite each other, the end of the first slider is equipped with a pin 21 protruding in between two pins 22,23 on the end of the second slider 3. The pins 21 are connected to the two other pins 22,23 with a string 24 running between the adjacent sides of the pins. When the sliders 2,3, during the assembly of the profiles, are exposed to opposing axial forces, the strings 24 between the pins 22,23 are torn and the two sliders 2,3 will thus be separated and subsequently appear as two individual sliders, as previously mentioned.

In connection with lifting columns having profiles with a circular cross section, round tubes, a problem may occur where the profiles can rotate about their longitudinal axis which may lead to malfunctioning of the lifting column. To prevent this, the outer side of the slider element 1 is equipped with a longitudinal rib 25 such that gives both the first slider 2 and the second slider 3 are furnished with a rib 25a,25b, when these are separated. The ribs 25a,25b protrude into a longitudinal groove 26 in the surrounding outer profile. As it appears from FIG. 11, the profile 11 is provided with longitudinal grooves 26 on the inner side intended for cooperation with the ribs of the sliders of a profile which protrudes into this.

The profile shown in FIG. 11 is actually the middle profile for a lifting column with three telescopic profiles, i.e. it represents in this context both an inner profile as stated but also an outer profile for the inner profile of the column, cf. the outline of a height-adjustable table of FIG. 9.

To further ensure a correct positioning of the slider element 1 during assembly and subsequently also the slider 3, the slider element is at its lower end furnished with an extra stud 9a below the rib 25 which likewise is pressed into a recess in the profile intended for that purpose.

FIGS. 15 and 16 of the drawing show an assembled inner profile 10 and outer profile 11 mounted with sliders 2,3 in the assembled state, and where the outer profile 11 on the outer side is also equipped with sliders 2,3 for an additional profile. In the inner profile 10 there is an endpiece 30 where a spindle-nut 31 for a hollow spindle 32 is mounted and in the end of the outer profile 11 there is also mounted an endpiece 33 for receiving the end of a solid spindle 34 which is in engagement with a spindle-nut 35 mounted at the end of the hollow spindle 32. For mounting the endpieces 30,33 in the profiles 10,11, the extra studs 9a on the sliders 3 are designed with an extended length, such that they with the end protrude into the hollow of the profile and thus grips into recesses 30a,33a intended for that purpose in the side of the endpieces. When the endpiece 30,33 is pressed into the profile 10,11 (FIGS. 17 and 18), it meets the studs 9a on the sliders 3 and will press the studs and thus the sliders outwards. The tongues 9b that are placed at the end of the sliders will retain and prevent the sliders for being pushed by the profile and spring back when the endpiece 30,33 is in place and grips under the studs 9a, more accurately so that the end walls 30a',33a' of the sliders grips under the studs 9a. At the top, the endpieces 30,33 have a round-going collar 30b,33b intended for engagement with the end of the profile. The endpieces are thus fixed between the end of the profile and the underside of the studs.

It is understood that this solution likewise can be utilized in connection with lifting columns where the profiles have a square cross section or any other cross section other than round. This ensures that the profile does not yield to either side, depending on whether the lifting column is extended or retracted.

FIG. 19 shows another embodiment of the slider element, here likewise intended for lifting columns made from profiles having a circular cross section, round tubes. The construction is among other things distinguished by the slider element 1 having a circular cross-section with an internal hollowness, which allows it to be placed over the profile. The element 1 comprises four sets of sliders of which the first sliders 2 are located between the second sliders 3, which are elongated, while the first sliders 2 are more tile-shaped and are located at the upper end of the slider element 1 as a whole, where they are connected with a circular ring 2a, which closes the gap between the inner and outer profile when these are assembled and thus prevents dirt from getting into the gap, where the dirt could otherwise interrupt the movement of the profiles, e.g. in that the friction on the surface of the profiles becomes rough or in other ways is destroyed. Furthermore, that ring 2a has a visually decorative effect by closing the gap between the two profiles. The second sliders 3 are interconnected by a band 3a along the lower edge and another further up just below the lower edge of the first sliders 2. The first sliders 2 are connected to the second sliders 3 by means of a string 24 in the sides of the adjacent second sliders 3. Otherwise, the second sliders 3 are here equipped with studs 9,9a for engagement with recesses in the inner profile. Here, that first sliders 2 are equipped with studs 8a on the external side for engagement with the recesses internally in the outer profile. When the outer profile and the inner profile are joint together the first sliders 2 and the second sliders 3 will be separated in that the string 24 between these is torn, and thus the second sliders 3 and the first sliders 2 are mounted on the inner profile and the outer profile, respectively. Unlike the previously mentioned embodiments, the sliders 2,3 are here displaced sideways, by which the sliders, if desired, can be made longer. Alternatively, the slider element 1 as a whole can be shortened as the length overall is solely determined by the length of the longest slider.

It is understood that a similar solution can be used in connection with lifting columns where the profiles have a square cross section or any type of cross section other than round.

It is further understood that the invention can of course also be used in lifting columns having two or more members, and for other purposes than tables. Just to mention a few other examples, the columns can be used in connection with adjustable beds or chairs. The columns can be made from aluminum or steel profiles or a combination of such profiles.

The invention is particularly intended for electrically driven lifting columns, where the drive unit can be an integrated part of the column or be a separate unit but is not limited to this.

The invention claimed is:

1. A slider element for lifting columns which lifting column comprises a first profile (10) and a second profile (11) arranged telescopically relative to each other, and where the slider element is configured to be arranged between the profiles, wherein the slider element (1) has a first slider (2) connected to a second slider (3) with a designated breaking line (4) located between the first slider (2) and the second slider (3), wherein the slider element (1) is configured to break at the designated breaking line (4) when the first slider (2) is pulled away from the second slider (3).

2. The slider element according to claim 1, wherein the first and second slider (2,3) are located in continuation of each other, and wherein the designated breaking line (4) is located between the adjacent ends of these.

3. The slider element according to claim 2, wherein the designated breaking line (4) is constituted by a pin on the end of one of the sliders (2) which is positioned between two pins on the end of the other slider (3), and wherein the pins are connected by a string.

4. The slider element according to claim 1, wherein each slider (2,3) comprises a base element (5), on which there is a rise (6) with a sliding surface (7).

5. The slider element according to claim 4, wherein the first slider (2) at each side comprises at least one resilient element (8), a tongue, which at an angle protrudes over the outer side of the base element (5).

6. The slider element according to claim 1, wherein the second slider (3) comprises a base element (5) with at least one stud (9) located on the inner side of the base element (5), the at least one stud (9) being configured for insertion into a recess (12) in the first profile (10).

7. The slider element according to claim 6, wherein the at least one stud (9) has a tongue (9b) constructed to grip behind the inner side of the first profile when the stud is inserted into the recess in the first profile.

8. The slider element according to claim 6, wherein the inner side of the base element includes a plurality of studs, and at least one stud (9a) has an extended length configured to protrude into a hollow (30a,33a) on the first profile the extended length stud further being configured to grip into a recess in an end piece (30,33) of the first profile.

9. The slider element according to claim 1, wherein the outer side of the slider element is equipped with a longitudinal rib (25) for cooperating with an axially running groove (26) in the second outer profile.

10. The slider element according to claim 9, wherein the second slider (3) comprises a base element (5) with at least one stud (9) located on the inner side of the base element, the at least one stud (9a) being located below the rib (25).

11. The slider element according to claim 1 wherein the slider element is cylindrical and configured for insertion over a profile and wherein the slider element comprises multiple sets of first and second sliders (2,3).

12. A lifting column comprising:
at least two profiles (10,11), a first profile (10) and a second profile (11), arranged telescopically relative to each other as the first profile (10) is intended for insertion into the second profile (11), and
at least one slider element (1) according to claim 1.

13. The lifting column according to claim 12, wherein recesses (12) for receiving studs (9) on the second slider (3) of the slider element are provided in the sides of the first profile (10), and on the inner side of the second profile there are indentations (13) for receiving a protruding resilient element (8) located on the first slider (2).

14. A method for mounting a slider element on a lifting column, the slider element comprising a first slider and a second slider between which there is a designated breaking line, wherein the lifting column comprises a first, inner profile (10) and a second, outer profile (11) arranged telescopically relative to each other, the method comprising the steps of:
mounting the slider element (1) on the outer side of the inner profile (10) by pressing one or more studs (9) located on the second slider (3) into one or more through-going holes (12) located on the inner profile;
inserting the inner profile (10) with the mounted slider element (1) into the hollow of the outer profile (11), until one or more resilient elements (8) located in the side of the first slider (2) snap into one or more indentations (13) located on the inner side of the outer profile (11); and
sliding the inner profile (10) further into the outer profile (11) until the slider element (1) breaks along the designated breaking line (4) between the first and the second slider (2,3), resulting in two separate sliders each mounted on one of the profiles (10,11).

15. A table equipped with one or more lifting columns according to claim 12.

* * * * *